UNITED STATES PATENT OFFICE.

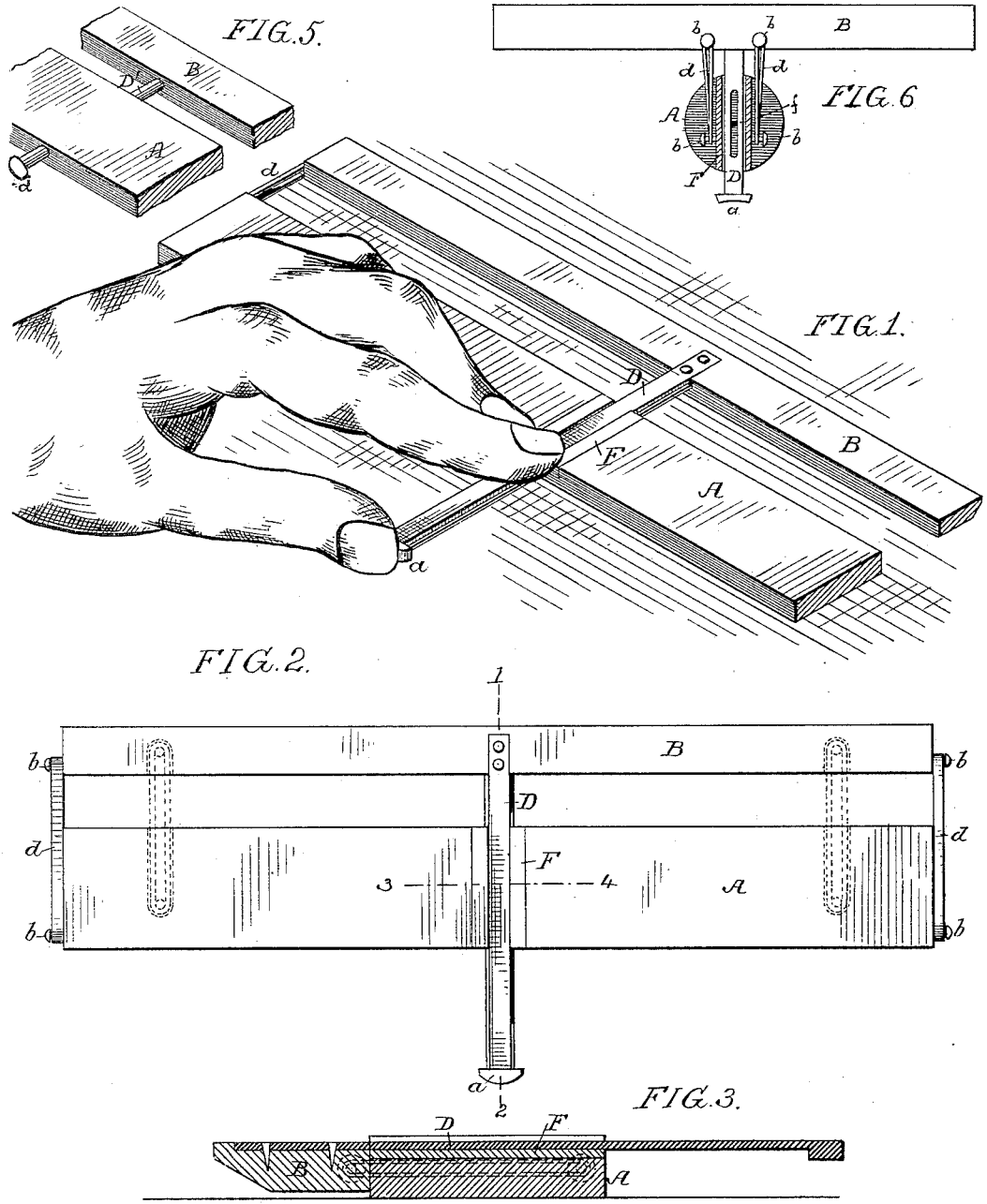

JOSEPH R. ANDERSON, OF PHILADELPHIA, PENNSYLVANIA.

PARALLEL-RULER.

SPECIFICATION forming part of Letters Patent No. 433,264, dated July 29, 1890.

Application filed September 16, 1889. Serial No. 324,079. (No model.)

*To all whom it may concern:*

Be it known that I, JOSEPH R. ANDERSON, a citizen of the United States, and a resident of Philadelphia, Pennsylvania, have invented certain Improvements in Parallel Rulers, of which the following is a specification.

My invention relates to that class of parallel-rulers which consist of two bars, one of which is guided so as to move in a line parallel with the other, so that by holding one bar of the ruler upon the surface on which the lines are to be drawn the other bar of the ruler can be adjusted toward and from the fixed bar, so as to provide for making two or more parallel lines without disturbing the position of said fixed bar.

The object of my invention is to so construct a ruler of this class as to permit of the ready movement of the ruling edge or bar from or toward the retained or fixed bar by one hand while the ruling is effected by means of a pen held in the other hand. This object I attain in the manner hereinafter set forth, reference being had to the accompanying drawings, in which—

Figure 1 is a perspective view of a portion of a parallel-ruler constructed in accordance with my invention. Fig. 2 is a plan view of the ruler. Fig. 3 is an enlarged section on the line 1 2, Fig. 2. Fig. 4 is an enlarged section on the line 3 4, Fig. 2, showing the ruler inverted. Fig. 5 is a perspective view illustrating a modification, and Fig. 6 is a sectional plan view of a special form of ruler embodying the invention.

The ruler consists of two bars A and B, the latter constituting the ruling or guiding bar and being provided with a stem D, which is T-shaped or undercut in cross-section and is adapted to a like T-shaped or undercut guide F, secured to the back of the bar A of the ruler, this stem D occupying a substantially-central position longitudinally on the ruler and preferably terminating at the inner end in a head $a$, so that the movable edge-bar B of the ruler can be readily moved away from the main bar A by pressing the thumb of the left hand upon the head $a$ of the stem D, while the fingers of the same hand hold the bar A of the ruler firmly down upon the surface on which the lines are to be ruled. (See Fig. 1.)

In order to provide for the convenient operation of the ruler by one hand, I provide means for retracting the outer or movable bar of the ruler when pressure is removed from the inner end of the stem D. For this purpose the opposite ends of the bars A and B of the ruler have projecting pins $b$, connected by means of elastic bands $d$, which have a constant tendency to draw the bar B of the ruler toward and to hold it in contact with the bar A. Simple pressure of the thumb upon the head $a$ of the stem D therefore provides for the movement of the bar B of the ruler away from the bar A, the said bar B approaching the bar A as soon as pressure is removed from the stem D.

The stem does not extend to the top of the guide-block F, so that if the ruler is used in the inverted position shown in Fig. 4 no pressure can be exerted upon the stem tending to restrict its free movement through the guide, and for the same reason the outer bar of the ruler is somewhat less in thickness than the main bar A, as shown in Fig. 3, thus preventing contact of the movable bar of the ruler with the surface on which the ruling is to be effected.

Although for economy and convenience of access it is preferable to locate the retracting-springs $d$ at the ends of the bars of the ruler, this is not absolutely essential to the proper carrying out of my invention—for instance, the springs may be located as shown by dotted lines in Fig. 2.

A simple pin D', passing through an opening in the bar A of the ruler and secured at its outer end to the bar B, may in the cheaper class of rulers take the place of the bar D and guide F, an instance of such modified construction being shown in Fig. 5.

A ruler adjustable to different angles may be constructed in accordance with my invention by making the bar A with rounded ends or in the form of a circular disk, as in Fig. 6, the guide F in this case being pivoted to the disk by means of a pin $f$, adapted to a slot in the stem D, and the retracting-springs $d$ being carried by the guide F, so as to swing with the same.

I am aware that it is old to construct a ruler having two parallel bars movable one in respect to the other and combined with an elastic cord tending to draw them toward each other, and I therefore make no claim to such combination separately considered, my invention comprising certain additional features of construction whereby a ruler of this character is rendered more effective than before, and the adjustment of the same is accomplished with greater facility than usual.

Having thus described my invention, I claim and desire to secure by Letters Patent—

1. The combination of the two bars of the ruler, the adjusting-stem secured to one bar and guided on the other and occupying a substantially central position longitudinally and an elastic connection between the two bars tending to draw them toward each other, substantially as specified.

2. The combination of the two bars of the ruler, the adjusting-stem secured to one bar and guided on the other, projecting pins at the opposite ends of the bars, and elastic bands adapted to said pins and serving to draw the two bars of the ruler toward each other, substantially as specified.

3. The combination of the two bars of the ruler, the outer bar being less in thickness than the main bar, an elastic connection between the two bars, and the adjusting-stem carried by the outer bar and adapted to a guide on the main bar or body of the ruler, substantially as specified.

4. The combination of the movable bar of the ruler and its operating-stem, the fixed bar, retracting-springs, and a guide for the operating-stem pivoted to said fixed bar and carrying the retracting-springs, substantially as specified.

In testimony whereof I have signed my name to this specification in the presence of two subscribing witnesses.

JOSEPH R. ANDERSON.

Witnesses:
R. SCHLEICHER,
HARRY SMITH.